US012546300B2

(12) United States Patent
Miller et al.

(10) Patent No.: US 12,546,300 B2
(45) Date of Patent: Feb. 10, 2026

(54) VACUUM PUMP

(71) Applicant: MILWAUKEE ELECTRIC TOOL CORPORATION, Brookfield, WI (US)

(72) Inventors: Justin Miller, Richfield, WI (US); Shrey M. Turakhiya, Milwaukee, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 107 days.

(21) Appl. No.: 17/943,328

(22) Filed: Sep. 13, 2022

(65) Prior Publication Data

US 2023/0081019 A1  Mar. 16, 2023

Related U.S. Application Data

(60) Provisional application No. 63/358,556, filed on Jul. 6, 2022, provisional application No. 63/243,344, filed on Sep. 13, 2021.

(51) Int. Cl.
*F04B 37/14* (2006.01)
*F04B 53/10* (2006.01)
(Continued)

(52) U.S. Cl.
CPC .......... *F04B 37/14* (2013.01); *F04B 53/1002* (2013.01); *F04B 53/1005* (2013.01);
(Continued)

(58) Field of Classification Search
CPC .. F04B 37/14; F04B 53/1002; F04B 53/1005; F16K 15/1843; F16K 15/1823; F16K 15/042; F16K 2200/201; F16K 2200/20
See application file for complete search history.

(56) References Cited

U.S. PATENT DOCUMENTS 2,329,087 A * 9/1943 Russell ................. F16K 15/044
137/550
2,733,664 A * 2/1956 Saalfrank ................ F04B 53/00
417/454
(Continued)

FOREIGN PATENT DOCUMENTS

CN  201250931 Y  6/2009
CN  201652597 U  11/2010
(Continued)

OTHER PUBLICATIONS

International Search Report and Written Opinion for Application No. PCT/US2022/043277 dated Jan. 4, 2023 (11 pages).
(Continued)

*Primary Examiner* — Christopher S Bobish
(74) *Attorney, Agent, or Firm* — Michael Best & Friedrich LLP

(57) ABSTRACT

A vacuum pump includes a motor, a pump coupled to the motor to receive torque therefrom, and a trestle including an inlet port, an outlet port, and a fluid pathway therebetween, the outlet port being fluidly connected to the pump. The vacuum pump also includes a first valve positioned within the fluid pathway and adjustable between an open state, in which an airflow induced by the pump is drawn through the inlet port, and a closed state, in which a reverse airflow through the inlet port is prevented, and a second valve positioned within the fluid pathway in series with the first valve and adjustable between an open state, in which the airflow induced by the pump is drawn through the inlet port, and a closed state, in which the reverse airflow through the inlet port is prevented when the motor is deactivated.

12 Claims, 6 Drawing Sheets

(51) Int. Cl.
*F16K 15/04* (2006.01)
*F16K 15/18* (2006.01)

(52) U.S. Cl.
CPC ........ *F16K 15/042* (2013.01); *F16K 15/1823* (2021.08); *F16K 15/1843* (2021.08); *F16K 2200/20* (2021.08); *F16K 2200/201* (2021.08)

(56) References Cited

U.S. PATENT DOCUMENTS

| | | | |
|---|---|---|---|
| 3,138,169 A | 6/1964 | Lambert | |
| 3,491,796 A * | 1/1970 | Domer | F16K 5/0605 |
| | | | 251/315.13 |
| 3,525,578 A * | 8/1970 | Le Blanc, Jr. | F04C 27/02 |
| | | | 418/82 |
| 3,621,879 A * | 11/1971 | Ticcioni | F16K 17/0406 |
| | | | 137/613 |
| 3,661,167 A * | 5/1972 | Hussey | F16K 15/042 |
| | | | 137/533.15 |
| 3,916,496 A * | 11/1975 | Freiheit | F04B 53/1022 |
| | | | 29/520 |
| 3,958,898 A * | 5/1976 | Abrahams | H02P 8/12 |
| | | | 417/36 |
| 4,453,898 A * | 6/1984 | Leka | F04B 53/164 |
| | | | 417/521 |
| 4,631,006 A * | 12/1986 | Murray | F04C 23/008 |
| | | | 418/270 |
| 4,649,952 A * | 3/1987 | Jobe | F16K 17/34 |
| | | | 137/614.16 |
| 4,934,914 A | 6/1990 | Kobayashi et al. | |
| 5,209,653 A * | 5/1993 | Murray | F04C 28/28 |
| | | | 417/435 |
| 5,551,479 A * | 9/1996 | Graves | F16K 5/0636 |
| | | | 251/315.12 |
| 5,624,244 A | 4/1997 | Moon | |
| 5,722,257 A | 3/1998 | Ishii et al. | |
| 6,396,404 B1 * | 5/2002 | McHugh | A62C 35/68 |
| | | | 137/557 |
| 6,705,846 B2 * | 3/2004 | Greiff | B60T 8/368 |
| | | | 417/560 |
| 7,069,997 B2 * | 7/2006 | Coyes | F16K 15/04 |
| | | | 166/325 |
| 7,404,538 B2 * | 7/2008 | Gill | F25B 41/38 |
| | | | 251/118 |
| 9,133,944 B2 * | 9/2015 | Haeckel | F16K 27/0245 |
| 9,138,216 B2 * | 9/2015 | Lonky | A61B 17/02 |
| 9,140,257 B2 * | 9/2015 | Jahn | F04B 9/045 |
| 9,500,206 B2 | 11/2016 | Zammuto | |
| 9,611,844 B2 | 4/2017 | Bauck et al. | |
| 9,732,869 B2 | 8/2017 | Hines et al. | |
| 9,791,054 B2 * | 10/2017 | Al-Amri | F16K 35/04 |
| 9,989,160 B2 | 6/2018 | Soeda | |
| 10,288,064 B2 | 5/2019 | Zammuto | |
| 10,591,075 B2 | 3/2020 | Klaphake | |
| 10,760,737 B2 * | 9/2020 | Green | F04B 39/0284 |
| 10,995,865 B2 | 5/2021 | Gutshall et al. | |
| 11,015,726 B2 | 5/2021 | Scopelite et al. | |
| 11,091,980 B2 * | 8/2021 | Stachowiak, Jr. | F04B 53/1007 |
| 11,125,349 B1 * | 9/2021 | Samayamantula | E21B 34/08 |
| 2003/0235509 A1 | 12/2003 | Maki | |
| 2004/0173312 A1 | 9/2004 | Shibayama et al. | |
| 2004/0226617 A1 * | 11/2004 | Arentsen | F16K 15/063 |
| | | | 137/614.2 |
| 2006/0180214 A1 * | 8/2006 | Arentsen | F16K 27/067 |
| | | | 137/613 |
| 2007/0215215 A1 * | 9/2007 | Arentsen | F16K 15/1848 |
| | | | 137/496 |
| 2007/0224064 A1 | 9/2007 | Brand et al. | |
| 2008/0145238 A1 | 6/2008 | Shibayama et al. | |
| 2009/0266840 A1 | 10/2009 | Brand et al. | |
| 2010/0098571 A1 | 4/2010 | Brand et al. | |
| 2010/0230624 A1 * | 9/2010 | Tejamo | F16K 5/201 |
| | | | 251/315.16 |
| 2017/0284550 A1 | 10/2017 | Hines et al. | |
| 2018/0126203 A1 | 5/2018 | Beluse | |
| 2018/0230900 A1 | 8/2018 | Diehm et al. | |
| 2018/0313453 A1 | 11/2018 | Roden et al. | |
| 2020/0040799 A1 | 2/2020 | Won | |
| 2020/0116264 A1 * | 4/2020 | Bell | F16K 5/0636 |
| 2023/0069417 A1 * | 3/2023 | Didwiszus | F16K 15/1823 |

FOREIGN PATENT DOCUMENTS

| | | |
|---|---|---|
| CN | 102278295 A | 12/2011 |
| CN | 202811456 U | 3/2013 |
| CN | 204025787 U | 12/2014 |
| CN | 106759721 A | 5/2017 |
| CN | 206682369 U | 11/2017 |
| CN | 108266381 A | 7/2018 |
| CN | 109869509 A | 6/2019 |
| CN | 110657266 A | 1/2020 |
| CN | 211059418 U | 7/2020 |
| CN | 212643063 U | 3/2021 |

OTHER PUBLICATIONS

Extended European Search Report for Application No. 22868194.6 dated Oct. 13, 2025 (10 pages).

* cited by examiner

VACUUM PUMP

CROSS-REFERENCE TO RELATED APPLICATIONS

This application claims priority to U.S. Provisional Patent Application No. 63/358,556, filed on Jul. 6, 2022, and U.S. Provisional Patent Application No. 63/243,344, filed on Sep. 13, 2021, the entire contents of both of which are incorporated herein by reference.

FIELD OF THE INVENTION

The present invention relates to pumps, and more particularly to recovery and vacuum pumps for refrigeration and air-conditioning systems.

BACKGROUND OF THE INVENTION

Vacuum pumps are typically used to remove atmospheric air and any entrained water vapor from an HVAC system (e.g., a refrigeration or air conditioning circuit) prior to a refrigerant being returned after any maintenance has been performed.

SUMMARY OF THE INVENTION

The invention provides, in one aspect, a vacuum pump including a motor, a pump coupled to the motor to receive torque therefrom, a trestle including an inlet port, an outlet port, and a fluid pathway therebetween the outlet port being fluidly connected to an inlet of the pump, a first valve positioned within the fluid pathway and adjustable between an open state, in which an airflow induced by the pump is drawn through the inlet port, and a closed state, in which a reverse airflow through the inlet port is prevented, and a second valve positioned within the fluid pathway in series with the first valve. The second valve is adjustable between an open state, in which the airflow induced by the pump is drawn through the inlet port, and a closed state, in which the reverse airflow through the inlet port is prevented when the motor is deactivated.

The invention provides, in another aspect, a vacuum pump including a motor, a pump coupled to the motor to receive torque therefrom, a trestle including an inlet port, an outlet port, and a fluid pathway therebetween, the outlet port being fluidly connected to the pump, a first valve positioned within the fluid pathway and including a ball and a shaft coupled to the ball, and a second valve positioned within the fluid pathway in series with the first valve. Rotation of the shaft rotates the ball to adjust the first valve between an open state, in which an airflow induced by the pump is drawn through the inlet port, and a closed state, in which a reverse airflow through the inlet port is prevented when the motor is deactivated.

The invention provides, in another aspect, a vacuum pump including a motor, a pump coupled to the motor to receive torque therefrom, a trestle including an inlet port, an outlet port, and a fluid pathway therebetween, the outlet port being fluidly connected to the pump, a first valve positioned within the fluid pathway and adjustable between an open state, in which an airflow induced by the pump is drawn through the inlet port, and a closed state, in which a reverse airflow through the inlet port is prevented, and a second valve positioned within the fluid pathway in series with the first valve, the second valve including a ball moveable along a plurality of ribs formed in the fluid pathway to adjust the second valve between an open state, in which an airflow induced by the pump is drawn through the inlet port, and a closed state, in which a reverse airflow through the inlet port is prevented when the motor is deactivated.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
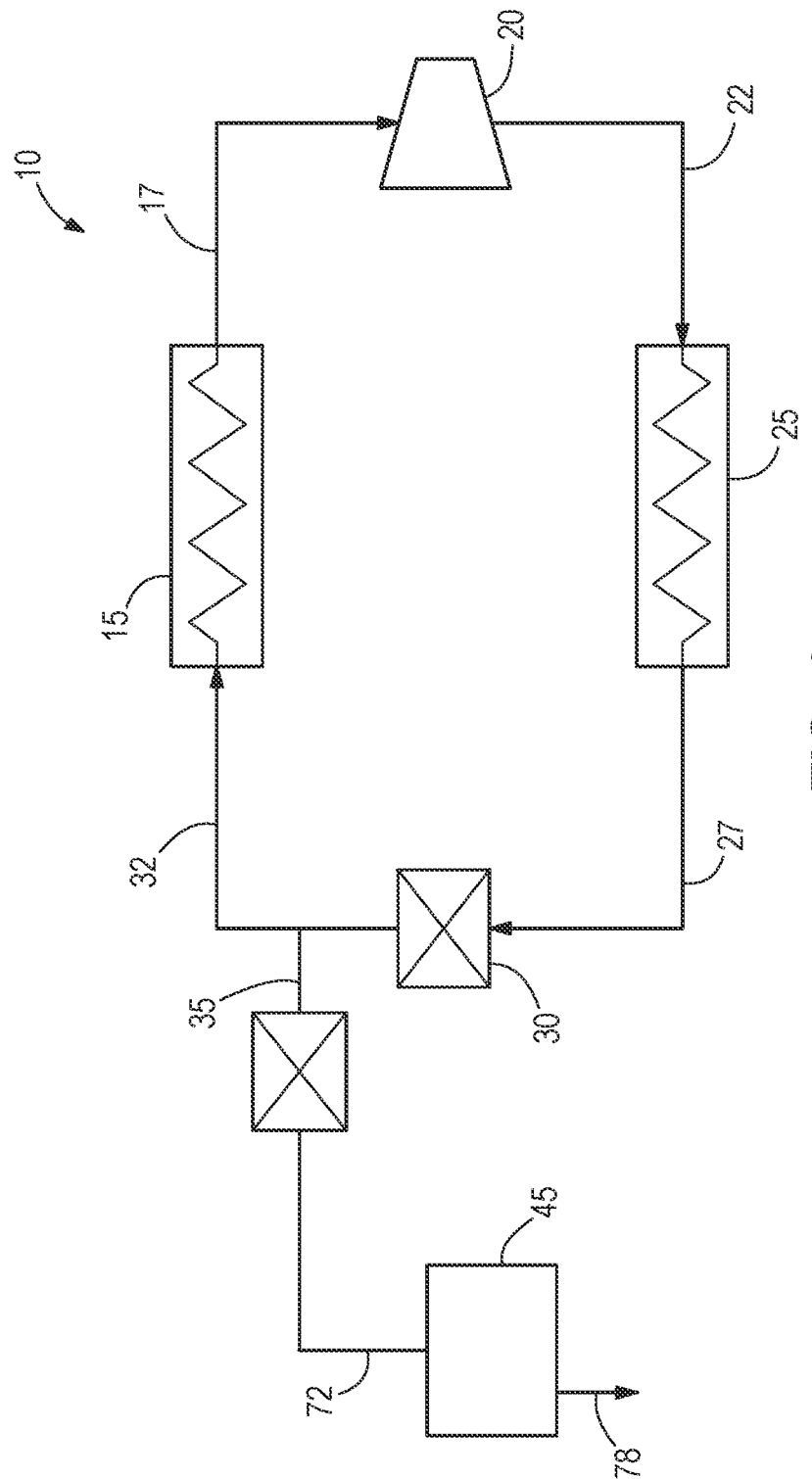
FIG. 1 is a schematic view of a recovery pump and a vacuum pump in accordance with an embodiment of the invention, illustrating the recovery pump and the vacuum pump in fluid communication with an HVAC system.

With reference to FIG. 1, an HVAC system (e.g., refrigeration or air conditioning circuit 10) includes an evaporator 15, a compressor 20, a condenser 25, and an expansion valve 30. A refrigerant circulates through the refrigeration circuit 10, changing phases between liquid and vapor when passing through the evaporator 15 and the condenser 25. The circuit 10 schematically illustrates a typical vapor-compression refrigeration cycle commonly known by those of ordinary skill in the art. HVAC systems, such as the illustrated air conditioning circuit 10, are commonly found in residential properties, commercial properties, vehicles, and many other systems.

When maintenance is to be performed on the air conditioning circuit 10 of an HVAC system, each component 15, 20, 25, 30 and interconnecting conduit lines 17, 22, 27, 32 are first drained or emptied of any refrigerant with, for example, a recovery pump (not shown). The air conditioning circuit 10 includes a port 35 to which the recovery pump and a vacuum pump 45, which is used to remove atmospheric air and any entrained water vapor from the circuit 10 prior to the refrigerant being returned after any maintenance has been performed, may be coupled.

Figure 2:
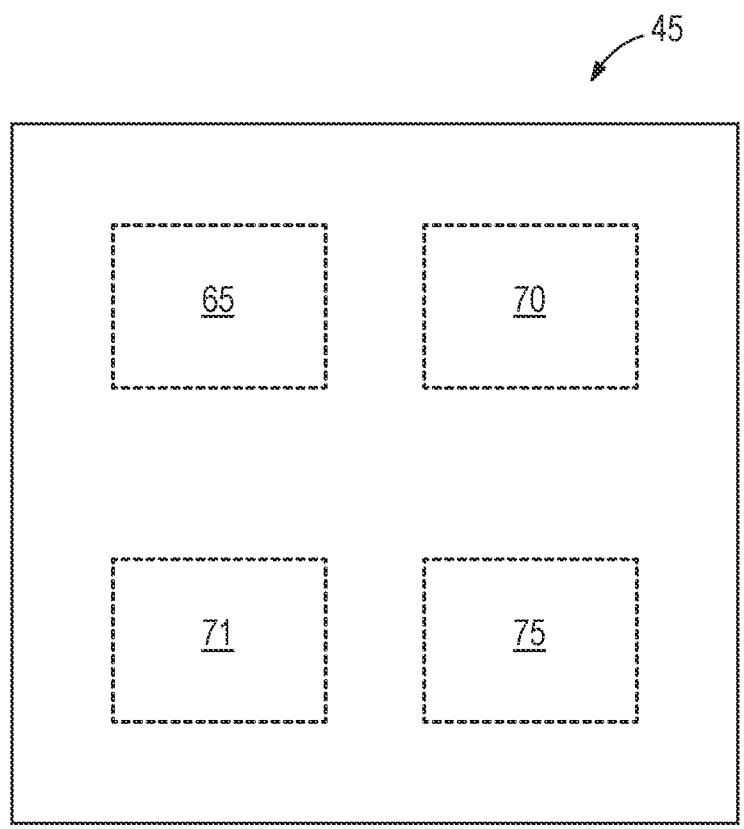
FIG. 2 is a schematic view of the vacuum pump of FIG. 1.
Figure 3:
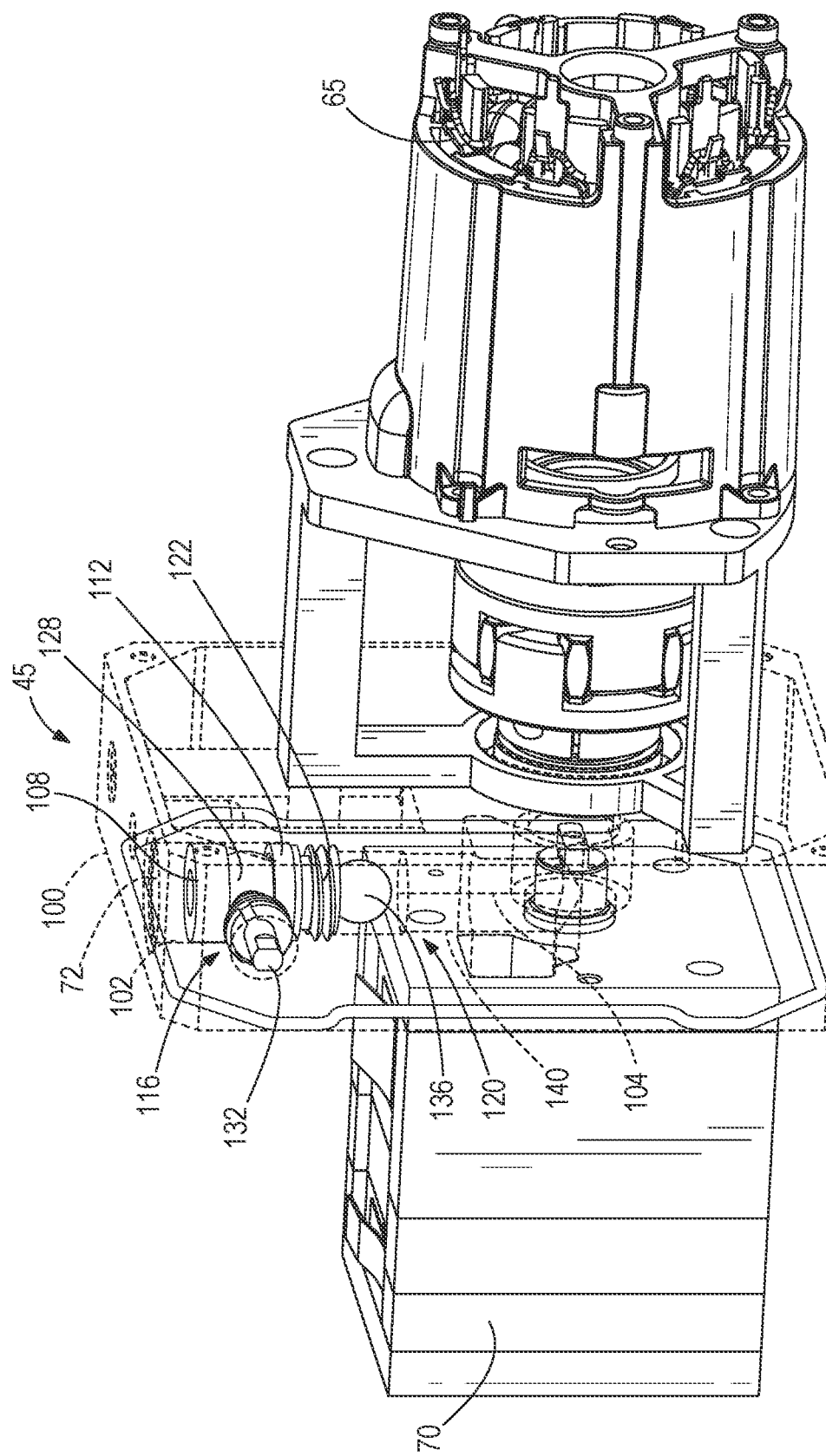
FIG. 3 is a perspective view of the vacuum pump of FIG. 1.

With reference to FIGS. 2 and 3, the vacuum pump 45 includes a motor 65, a pump 70 driven by the motor 65 that is operable to draw suction, and an electronic control unit or controller 71 for controlling operation of the motor 65. An inlet port 72 of the vacuum pump 45 (FIG. 3) is coupled to the port 35 of the air conditioning circuit 10 to draw refrigerant from the air conditioning circuit 10. In other embodiments, the vacuum pump 45 may be coupled to alternative circuits.

The pump 70 of the illustrated embodiment is a rotary vane pump commonly known in the art. The motor 65 is powered by an 18-volt lithium-ion battery pack 75 (FIG. 2). In other embodiments, multiple battery packs 75 may achieve a higher voltage (if used in series) or a higher capacity (if operating in parallel). In yet other embodiments, the battery pack 75 may include a different nominal voltage (e.g., 12 volts, 24 volts, etc.). In yet other embodiments, the vacuum pump 45 may include a power cord for connection to an external power source (e.g., AC power through a wall outlet). The illustrated motor 65 is a brushless direct current (i.e., BLDC) motor. But, in other embodiments of the vacuum pump 45, the motor 65 may be a brushed DC motor or an alternating current (i.e., AC) motor.

The vacuum pump 45 includes the inlet port 72 (FIG. 1) for drawing atmospheric air from the circuit 10 and an outlet port 78 for discharging the air and water vapor to atmosphere. In use, the controller 71 activates the motor 65 (and therefore the pump 70) to draw a deep vacuum in the circuit 10 to remove air and any contaminants (e.g., water vapor, etc.) remaining in the circuit 10. The air and contaminants are drawn out through the port 35, through the inlet port 72 of the vacuum pump 45, and to the outlet port 78. The air and contaminants are then expelled into the environment. In other embodiments, the air and contaminants may be stored in a tank.

Figure 4:
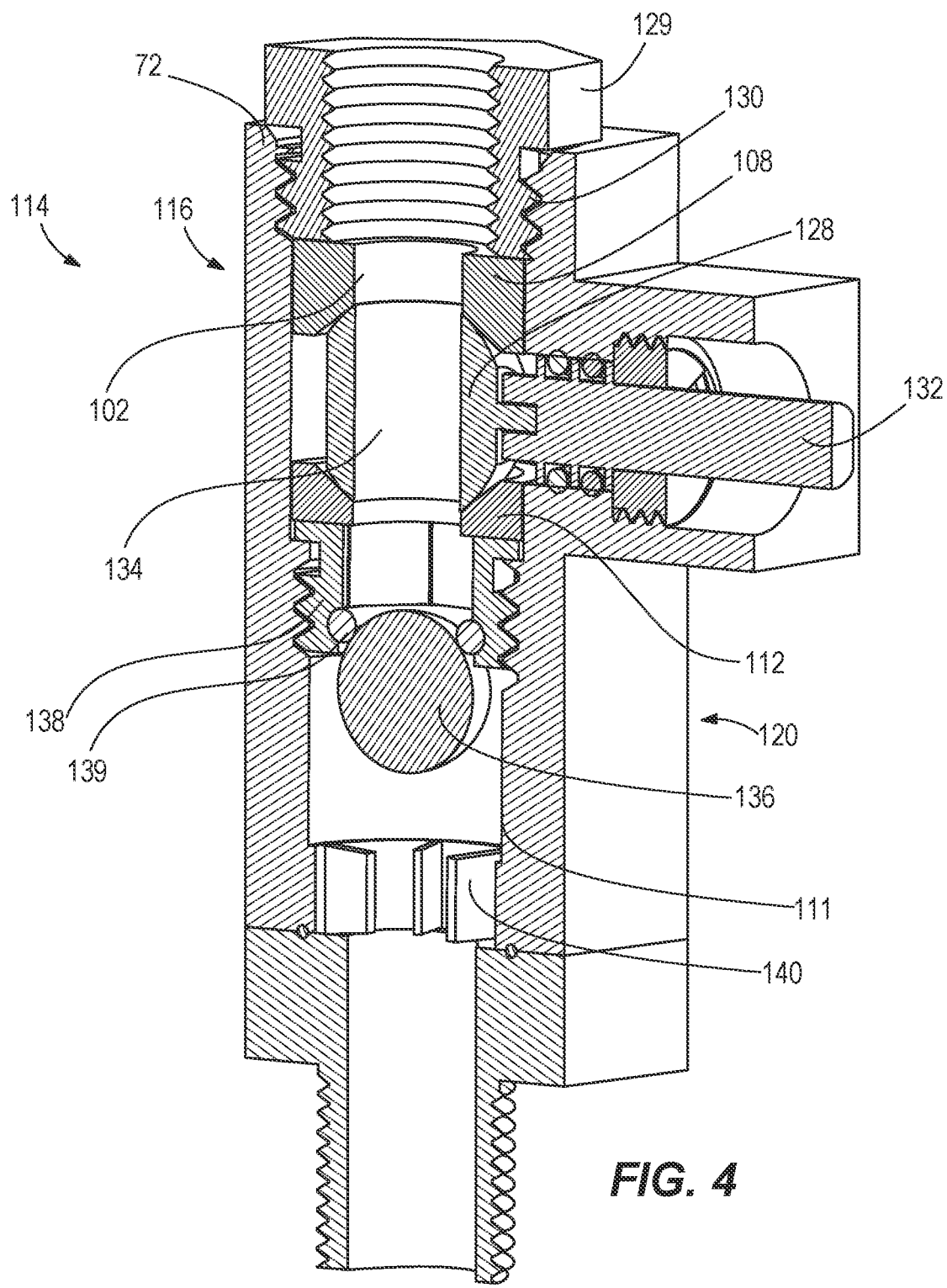
FIG. 4 is a cross-sectional view of a ball valve of the vacuum pump of FIG. 1.

With reference to FIG. 3, the vacuum pump 45 further includes a trestle 100 positioned between the pump 70 and the motor 65. The trestle 100 is a hollow body defining a fluid pathway 102 that extends between the inlet port 72, which is on the trestle 100, and the pump 70. The trestle 100 also includes a trestle outlet 104, which is fluidly connected with an inlet of the pump 70. The trestle 100 further includes a valve assembly 114 having an integrated ball valve 116 and a check valve 120, which are located in series within the fluid pathway 102 between the inlet port 72 and the trestle outlet 104. The ball valve 116 is positioned downstream of the inlet port 72 in a direction of an airflow induced by the pump 70, and the check valve 120 is positioned downstream of the ball valve 116 in the direction of the airflow induced by the pump 70. The ball valve 116 includes an inlet seat 108, an outlet seat 112 spaced from the inlet seat 108, and a ball 128 positioned between the inlet seat 108 and the outlet seat 112 (FIG. 4). The ball 128 is seated against each of the inlet seat 108 and the outlet seat 112, thus forming a seal with each of the inlet seat 108 and the outlet seat 112. In some embodiments, the ball valve 116 may also include a threaded fitting 122 for threading the ball valve 116 within the trestle 100 (FIG. 3).

With reference to FIG. 4, the ball valve 116 includes a manifold 129 having outer threads 130 that align with threads disposed proximate the inlet port 72 in the fluid pathway 102. The threads 130 seal the manifold with the inlet port 72. The manifold 129 abuts the inlet seat 108 such that the manifold 129 exerts a constant force onto the inlet seat 108.

Figure 5:
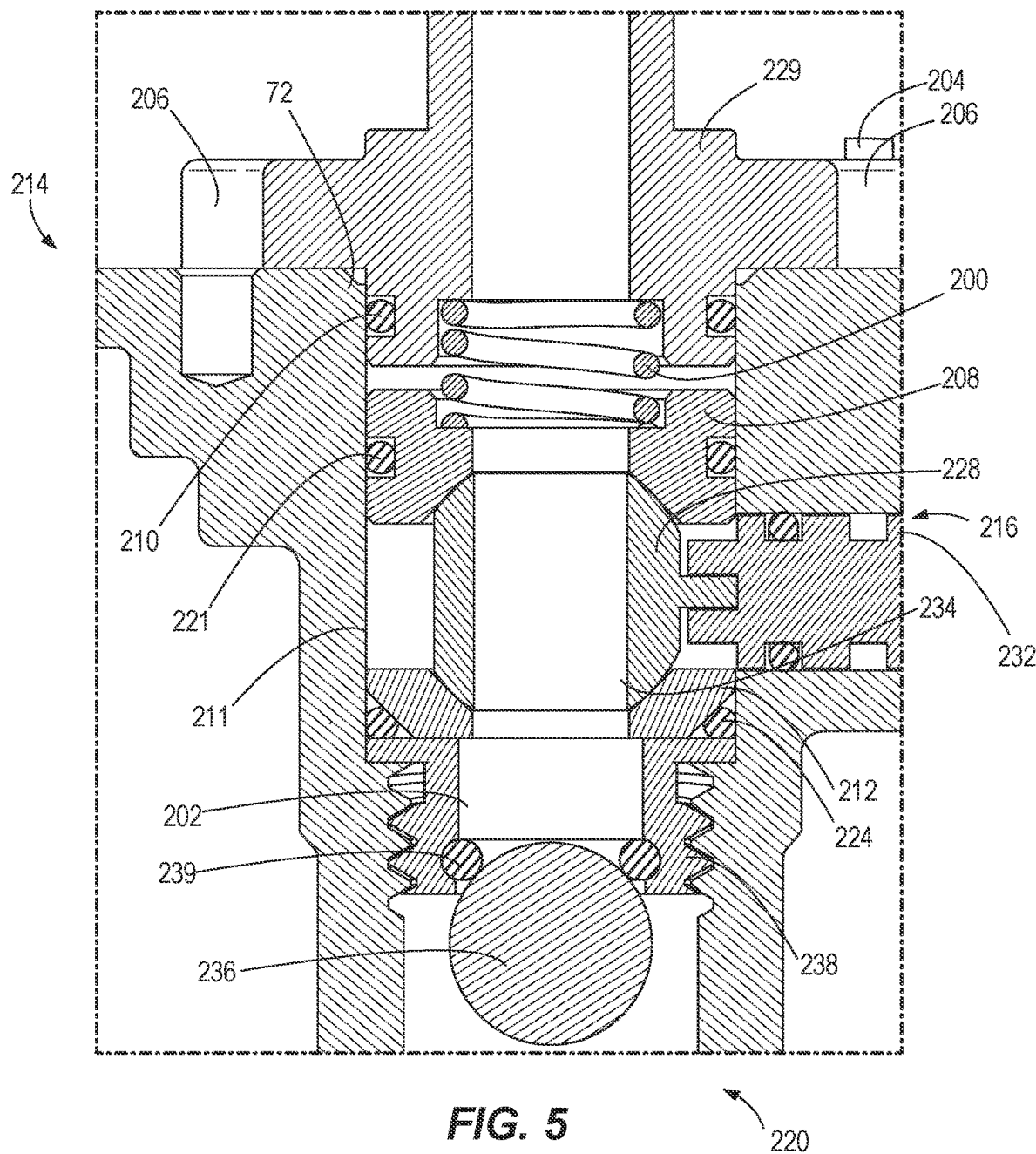
FIG. 5 is a cross-sectional view of a ball valve of a vacuum pump according to another embodiment of the invention.

FIG. 5 illustrates a valve assembly 214 according to another embodiment of the disclosure. The valve assembly 214 is similar to the valve assembly 114 described above and includes much of the same structure. And, the valve assembly 214 is disposed in the trestle 100, as explained above. Features and elements that are similar to the features and elements of the valve assembly 114 are assigned the same reference numerals plus "100." It should be understood that the features of the valve assembly 214 that are not explicitly described below have the same properties as the features of the valve assembly 114.

The valve assembly 214 includes a spring 200 disposed between a manifold 229 and the inlet seat 208 such that the spring 200 pushes the inlet seat 208 away from the manifold 229. The manifold 229 is coupled to the inlet port 72 via fasteners 204. The fasteners 204 couple arms 206 of the manifold 229 onto an outer surface of the trestle 100. An O-ring 210 is disposed on an outer portion of the manifold 229 such that the manifold 229 is sealed with an inner surface 211 of a fluid pathway 202. An O-ring 221 is additionally disposed on the inlet seat 208 such that a seal is created between the inlet seat 208 and the inner surface 211 of the fluid pathway 202. In some embodiments, an O-ring 224 may also be disposed on the outlet seat 212 to create a seal between the outlet seat 212 and the inner surface 211 of the fluid pathway 202.

With reference to FIGS. 3 and 4, the ball valve 116 further includes a lever (not shown) and a shaft 132 coupled to the ball 128, which includes a hole 134 therethrough. The hole 134 passes through the ball 128, permitting fluid flow through the ball 128. The lever is pivotably coupled to the ball 128 via the shaft 132, which transfers rotational motion to the ball 128 such that rotation of the lever also rotates the ball 128. The ball 128 and shaft 132 are rotatable between an open position, in which the hole 134 in the ball 128 is coaxially aligned with the fluid pathway 102 through the inlet seat 108 and the outlet seat 112 (coinciding with an open state of the ball valve 116), and a closed position, in which the hole 134 in the ball 128 is misaligned with the fluid pathway 102 through the inlet seat 108 and the outlet seat 112 (coinciding with a closed state of the ball valve 116). In some embodiments, the open position is 90 degrees from the closed position.

In the open position, the ball 128 permits flow through the fluid pathway 102 in the trestle 100 such that fluid may pass from the inlet port 72, through the ball 128, and to the trestle outlet 104. In the closed position, the ball 128 is rotated such that the hole 134 is misaligned with the fluid pathway 102 in the trestle 100 such that fluid is unable to pass through the ball valve 116. When the lever and shaft 132 are rotated to a position between the open position and the closed position, the ball 128 is rotated to a partially opened position such that a reduced volumetric flow rate of fluid can pass through the hole 134 relative to the (fully) open position. In other words, the flow of the fluid through the ball valve 116 decreases as the shaft 132 and ball 128 move from the open position to the closed position.

With continued reference to FIG. 3, the check valve 120 is located within a vertically oriented section of the fluid pathway 102 within the trestle 100. The check valve 120 includes a ball 136 that is moveable within the fluid pathway 102 in the trestle 100. The ball 136 is movable between a closed position, in which the ball 136 abuts an internal seat 138 and an O-ring 139 within the fluid pathway 102, and an open position in which the ball 136 is spaced from the internal seat 138.

The check valve 120 includes ribs 140 formed in the fluid pathway 102 to support the ball 126 within the fluid pathway 102 when the ball is in the open position. When the ball 126 is in the closed position, the ball 126 is spaced from the ribs 140. In some embodiments, the check valve 120 includes three ribs 140 disposed equidistant from each other on the surface of the fluid pathway 102. In other embodiments, the check valve 120 may include greater or fewer than three ribs 140. In yet other embodiments, the ribs 140 may not be equidistant from each other. The ribs 140 prevent lateral movement of the ball 136 in the fluid pathway 102 and are positioned vertically along an inner surface 111 of the fluid pathway 102, in a direction of the fluid flow, to create an annular gap or space between the ball 136 and the inner surface of the fluid pathway 102. The space allows fluid to pass through the fluid pathway 102, around the ball 136.

Figure 6:
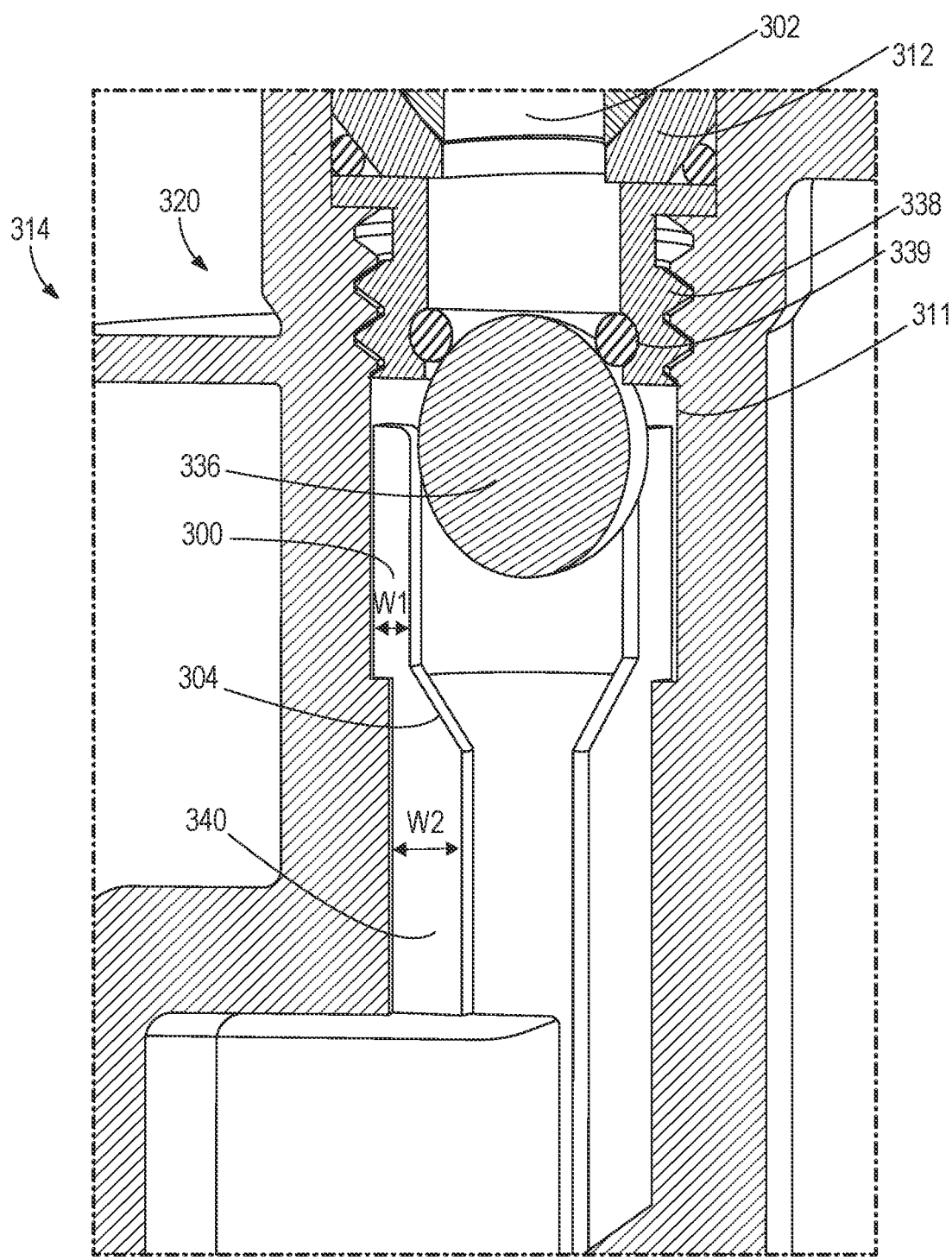
FIG. 6 is a cross-sectional view of a check valve of a vacuum pump according to another embodiment of the invention.

FIG. 6 illustrates a valve assembly 314 according to another embodiment of the disclosure. The valve assembly 314 is similar to the valve assembly 114 described above and includes much of the same structure. And, the valve assembly 314 is disposed in the trestle 100, as explained above. Features and elements that are similar to the features and elements of the valve assembly 114 are assigned the same reference numerals plus "200." It should be understood that the features of the valve assembly 314 that are not explicitly described below have the same properties as the features of the valve assembly 114.

The valve assembly 314 includes a check valve 320, which is located in series within a fluid pathway 302 between the inlet port 72 and the trestle outlet 104. The check valve 320 includes small ribs 300 disposed between the ribs 340 and the outlet seat 312 in the fluid pathway 302 to support a ball 336 within the fluid pathway 302. In the depicted embodiment, the check valve 320 includes three of the small ribs 300 disposed equidistant from each other on an inner surface 311 of the fluid pathway 302. In other embodiments, the check valve 320 may include fewer than or more than three of the small ribs 300. In other embodiments, the small ribs 300 may not be disposed equidistant from each other. The small ribs 300 are integrally connected to the ribs 140 such that the small ribs 300 and the ribs 340 form a continuous rib. The small ribs 300 define a radial width W1 that is less than a radial width W2 of the ribs 340. Each of the ribs 340 includes an angled section 304 that decreases a width of the rib 340 from the radial width W2 to the radial width W1. The angled sections 304 of each rib 340 together form a seat for supporting the ball 336 when the ball 336 is in an open position. In other embodiments, the small ribs 300 may be disconnected and separate from the ribs 340. In further embodiments, the check valve 320 may not include the small ribs 300.

During operation of the vacuum pump 45, depending on which of the valve assemblies 114, 214, 314 are used, the ball 136, 236, 336 is movable between the closed position, in which the ball 136, 236, 336 abuts the internal seat 138, 238, 338 and the O-ring 139, 239, 339 to prevent fluid flow through the pathway (coinciding with a closed state of the check valve 120, 220, 320), and the open position in which the ball 136, 236, 336 is spaced from the internal seat 138, 238, 338 and supported by the ribs 140, 340 (coinciding with an open state of the check valve 120, 220, 320). In the closed position, the ball 136, 236, 336 creates a seal with the internal seat 138, 238, 338 such that fluid is unable to pass through the fluid pathway 102, 202, 302. In the open position, the ball 136, 236, 336 is supported by or held against the ribs 140, 340, spaced from the internal seat 138, 238, 338 in the fluid pathway 102, 202, 302, such that the fluid can pass around the ball 136, 236, 336.

In response to activation of the motor 65, with the ball valve 116, 216, 316 in the open position, the pump 70 is driven to induce the airflow through the inlet port 72, the ball valve 116, 216, the check valve 120, 230, 320, and the trestle outlet 104 in series. The induced airflow and/or the weight of the ball 136, 236, 336 maintains the ball 136, 236, 336 in the open position against the ribs 140, 340 and away from the internal seat 138, 238, 338 in the fluid pathway 102, 202, 302. When the motor 65 is deactivated, the induced airflow created by the pump 70 ceases, or when backflow through the fluid pathway 102, 202, 302 occurs, the ball 136, 236, 336 is drawn toward the internal seat 138, 238, 338 within the fluid pathway 102, 202, 302 toward the closed position. In this position, fluid is unable to backflow from the trestle outlet 104 toward the inlet port 72, maintaining the circuit 10 in a vacuum after the vacuum pump 45 is deactivated. If a tighter seal is desired, the user may rotate the shaft 132, 232 of the ball valve 116, 216 to the closed position, thereby misaligning the hole 134, 234 in the ball 128, 228 from the fluid flow path 102, 202, 302 through the inlet seat 108, 208 and outlet seat 112, 212. This forms a tighter seal between the inlet port 72 and the trestle outlet 104 because the ball valve 116, 236 and the check valve 120, 220, 320 are in series with one another and are both closed. The tighter seal prevents any backflow of air and contaminants from re-entering the circuit 10 when the vacuum pump 45 is not operating.

Since the vacuum pump 45 includes both the ball valve 116, 216 and the check valve 120, 220, 320, debris and oil are prevented from re-entering the circuit 10 after maintenance has been performed and prior to the circuit 10 being recharged with new refrigerant. This is due to the combination of the ball valve 116, 216 and the check valve 120, 220, 320 providing a more robust barrier between the circuit 10 and the trestle outlet 104 of the vacuum pump 45, compared to traditional vacuum pumps that are ordinarily provided with a single valve to prevent such backflow.

Although the invention has been described in detail with reference to certain preferred embodiments, variations and modifications exist within the scope and spirit of one or more independent aspects of the invention as described.

Various features of the invention are set forth in the following claims.

What is claimed is:

1. A vacuum pump comprising:
   a motor;
   a pump coupled to the motor to receive torque therefrom;
   a trestle positioned between the motor and the pump, the trestle including an inlet port, an outlet port, and a fluid pathway therebetween, the outlet port being fluidly connected to the pump and positioned between the inlet port and an inlet of the pump;
   a first valve positioned within the fluid pathway and adjustable between an open state, in which an airflow induced by the pump is drawn through the inlet port, and a closed state, in which a reverse airflow through the inlet port is prevented; and
   a second valve positioned within the fluid pathway in series with and downstream of the first valve in a direction of the airflow induced by the pump and adjustable between an open state, in which the airflow induced by the pump is drawn through the inlet port, and a closed state, in which the reverse airflow through the inlet port is prevented when the motor is deactivated;
   wherein the first valve includes an inlet seat, an outlet seat downstream of the inlet seat, and a first ball, wherein the first ball is positioned between the inlet seat and the outlet seat, wherein the inlet seat and the outlet seat are positioned in the fluid pathway, and wherein rotation of the first ball adjusts the first valve between the open state and the closed state,
   wherein the second valve includes a second ball movable within in the fluid pathway relative to the first ball of the first valve, and wherein in the closed state the second ball abuts an internal seat of the second valve, and in the open state the second ball is spaced from the internal seat, wherein the internal seat is threadably coupled to the trestle, wherein the internal seat of the second valve abuts and supports the outlet seat, and wherein a seal is positioned between the internal seat of the second valve and the outlet seat of the first valve, the seal being positioned outwardly of abutting surfaces of the internal seat and the outlet seat.

2. The vacuum pump of claim 1, wherein the second valve may assume the closed state position when the first valve is in either the open state or the closed state.

3. The vacuum pump of claim 2, wherein the first valve includes a shaft coupled to the first ball, and wherein rotation of the shaft rotates the first ball.

4. The vacuum pump of claim 3, wherein the first ball of the first valve includes a hole that extends through the first ball, and wherein in the open state the hole is coaxially aligned with an axis defined by the fluid pathway, and in the closed state the hole is misaligned with the axis defined by the fluid pathway.

5. The vacuum pump of claim 1, wherein the first valve is positioned downstream of the inlet port in the direction of the airflow induced by the pump.

6. A vacuum pump comprising:
a motor;
a pump coupled to the motor to receive torque therefrom;
a trestle positioned between the motor and the pump, the trestle including an inlet port, an outlet port, and a fluid pathway therebetween, the outlet port being fluidly connected to the pump and positioned between the inlet port and an inlet of the pump;
a first valve positioned within the fluid pathway and including a manifold sealed with the inlet port and positioned in the fluid pathway, an inlet seat, an outlet seat downstream of the inlet seat, a first ball, and a shaft coupled to the first ball, wherein the first ball is positioned between an inlet seat and an outlet seat, and wherein the inlet seat and the outlet seat are positioned in the fluid pathway;
a spring disposed between the manifold and the inlet seat, wherein the spring biases the inlet seat away from the manifold; and
a second valve positioned within the fluid pathway in series with and downstream from the first valve in a direction of an airflow induced by the pump, the second valve including a second ball movable within in the fluid pathway relative to the first ball of the first valve,
wherein rotation of the shaft rotates the first ball to adjust the first valve between an open state, in which an airflow induced by the pump is drawn through the inlet port, and a closed state, in which a reverse airflow through the inlet port is prevented when the motor is deactivated,
wherein in a closed state the second ball abuts an internal seat of the second valve, and in an open state the second ball is spaced from the internal seat,
wherein the internal seat is threadably coupled to the trestle,
wherein the internal seat of the second valve is abuts and supports the outlet seat, and
wherein a seal is positioned between the internal seat of the second valve and the outlet seat of the first valve, the seal being positioned outwardly of abutting surfaces of the internal seat and the outlet seat.

7. The vacuum pump of claim 6, wherein the first ball of the first valve includes a hole that extends through the first ball, and wherein in the open state the hole is coaxially aligned with an axis defined by the fluid pathway, and in the closed state the hole is misaligned with the axis defined by the fluid pathway.

8. The vacuum pump of claim 6, wherein an O-ring is disposed on the inlet seat, and wherein the O-ring creates a seal between the inlet seat and a surface of the fluid pathway.

9. A vacuum pump comprising:
a motor;
a pump coupled to the motor to receive torque therefrom;
a trestle positioned between the motor and the pump, the trestle including an inlet port, an outlet port, and a fluid pathway therebetween, the outlet port being fluidly connected to the pump and positioned between the inlet port and an inlet of the pump;
a first valve positioned within the fluid pathway and adjustable between an open state, in which an airflow induced by the pump is drawn through the inlet port, and a closed state, in which a reverse airflow through the inlet port is prevented; and
a second valve positioned within the fluid pathway in series with and downstream from the first valve in a direction of the airflow induced by the pump, the second valve including a ball moveable along a plurality of ribs formed in the fluid pathway to adjust the second valve between an open state, in which an airflow induced by the pump is drawn through the inlet port, and a closed state, in which a reverse airflow through the inlet port is prevented when the motor is deactivated,
wherein the first valve is adjustable between the closed state and the open state when the second valve is in either the open state or the closed state,
wherein the second valve is adjacent to the first valve,
wherein in the closed state the ball abuts an internal seat of the second valve, and in the open state the ball is spaced from the internal seat and is supported by the plurality of ribs,
wherein the internal seat is threadably coupled to the trestle,
wherein the internal seat of the second valve abuts and supports an outlet seat of the first valve, and
wherein a seal is positioned between the internal seat of the second valve and the outlet seat of the first valve, the seal being positioned outwardly of abutting surfaces of the internal seat and the outlet seat.

10. The vacuum pump of claim 9, wherein the plurality of ribs are disposed equidistant from each other on a surface of the fluid pathway.

11. The vacuum pump of claim 10, wherein the plurality of ribs is a first plurality of ribs, wherein the second valve further comprises a second plurality of ribs conjoined, respectively, with the first plurality of ribs, and wherein a first radial width of the first plurality of ribs is less than a second radial width of the second plurality of ribs.

12. The vacuum pump of claim 11, wherein the second valve further comprises a seat defined by a plurality of angled sections disposed between the first and second pluralities of ribs, wherein the angled sections transition the first plurality of ribs from the first radial width to the second radial width of the second plurality of ribs, and wherein the ball is supportable upon the seat when the second valve is in the open state.

* * * * *